United States Patent [19]

Poplawski

[11] 4,121,691
[45] Oct. 24, 1978

[54] COMPOSITE INSPECTION PLATE-STEP

[75] Inventor: Eugene M. Poplawski, Aurora, Ill.

[73] Assignee: Caterpillar Tractor Co., Peoria, Ill.

[21] Appl. No.: 842,817

[22] Filed: Oct. 17, 1977

[51] Int. Cl.² ............................................. B60R 3/00
[52] U.S. Cl. ..................................... 182/90; 280/163
[58] Field of Search ................... 182/90, 92, 120, 228, 182/194; 280/163

[56] References Cited

U.S. PATENT DOCUMENTS

| 927,491 | 7/1909 | Colborne | 182/194 |
|---|---|---|---|
| 1,505,015 | 8/1924 | Dunlap | 182/90 |
| 2,580,326 | 12/1951 | Stevens | 182/90 |
| 3,171,671 | 3/1965 | Cornett | 280/163 |
| 3,971,456 | 7/1976 | Yonce | 280/163 |

Primary Examiner—Reinaldo P. Machado
Attorney, Agent, or Firm—John L. James

[57] ABSTRACT

A composite inspection plate-step has a first member and at least one step member. The first member has a middle portion and inner and outer surfaces. The first member has at least one opening of a preselected configuration through the middle portion and is defined by a lower edge.

The step member has first and second portions and is of a generally "J" configuration. The first portion extends substantially completely across and a preselected distance through the opening in the first member and is fixedly connected to the lower edge of the opening and is generally horizontal in the installed position. The second portion is fixedly connected to the outer surface of the first member.

The first member is releaseably connected over an inspection port of associated structure by fastening means.

10 Claims, 3 Drawing Figures

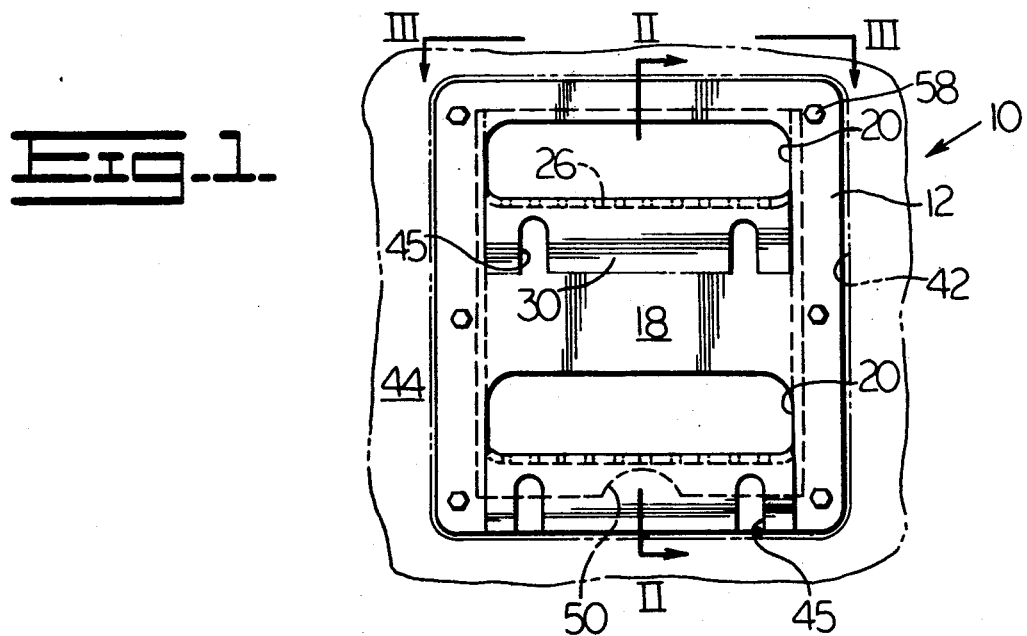
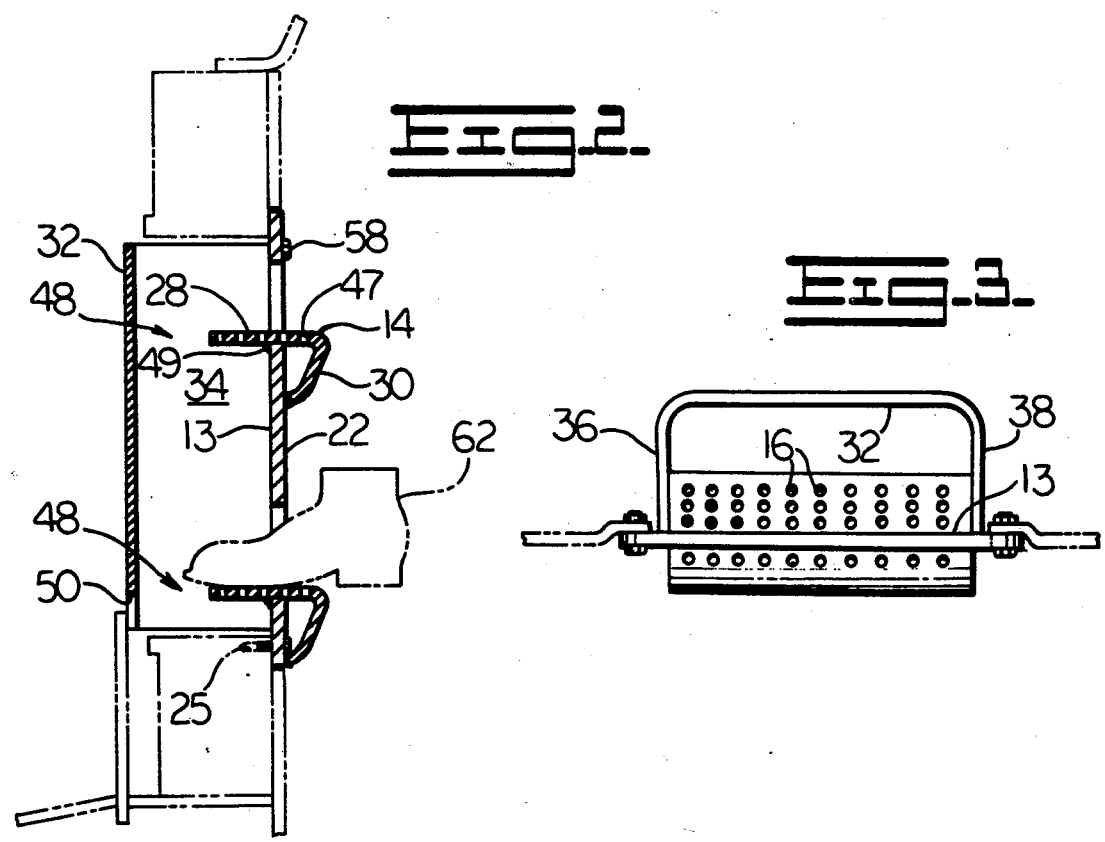

COMPOSITE INSPECTION PLATE-STEP

BACKGROUND OF THE INVENTION

This invention pertains to a combination of inspection plate and safety step.

Conventional step rungs or ladders were attached to an outer surface of a vehicle or other structure fixed to the ground in an outwardly protruding configuration, thus being subject to breakage from impact. Ladders tended to provide too little toe room for an operator when mounted on the outside of a vehicle side panel, for example, and not of desirable protection for adjacent machine components. Step rungs also provide undesirable support to a man's foot. Both types were subject to slipperyness when exposed to the elements.

Further, the location of step rungs and ladders necessarily avoided the areas of normal machine inspection plates and maintenance points, owing to the problems of inaccessability and waste of time in disassemblying the ladders to gain inspection access.

The present invention is directed to overcoming one or more of the problems set forth above.

According to the present invention, a composite inspection plate-step has a first member and at least one step member. The first member has a middle portion and inner and outer surfaces. The first member has at least one opening of a preselected configuration through the middle portion and is defined by a lower edge.

The step member has first and second portions and is of generally "J" configuration. The first portion extends substantially completely across and a preselected distance through the opening in the first member. The first portion is fixedly connected to and oriented generally normal to the lower edge of the opening. The first portion of the step member is generally horizontal in the installed position of the first member. The second end portion is fixedly connected to the outer surface of the first member.

BRIEF DESCRIPTION OF THE DRAWINGS

FIG. 1 is a diagrammatic side view of an inspection plate-step showing the details of a double step arrangement;

FIG. 2 is a diagrammatic view of a double step arrangement, in cross section, taken along line II—II of FIG. 1.

FIG. 3 is a diagrammatic top view of a step arrangement.

DETAILED DESCRIPTION OF THE INVENTION

Referring to FIGS. 1 and 2, a composite inspection plate-step 10, is comprised of a first member 12 and at least one step member 14. The first member has a middle portion 18, an inner surface 13, an outer surface 22 and at least one opening 20 of preselected configuration through the middle portion 18. The opening 20 is defined by a lower edge 26 and is of a size sufficient for receiving a man's foot 62.

The first member 12 is releasably connected over an inspection port 42 of an associated structure 44 by a plurality of fasteners 58.

The first member may have several openings 20 arranged to suit any number of combinations of inspection plate-steps or machine requirements. The mounting arrangement may be releasably connected to the inspection port 42 in any of several arrangements. On either the right or left vertical side, a strap hinge having two sides may be fastened; one side to the first member 12, the other side to associated structure 44. Either a bolt or a lock may secure the opposite vertical side.

A step member 14, has a first portion 28 and a second portion 30 and is of a generally "J" configuration. The first portion 28 extends substantially completely across and a preselected distance through the first member opening 20. The first portion 28 is fixedly connected to and oriented generally normal to the lower edge 26 of the opening 20 and is generally horizontal in the installed position of the first member 12. The second portion 30 is fixedly connected to the outer surface 22 of the first member 12.

The step member 14 can have a multiplicity of holes 47 extending through its first portion 28. The step member 14 may be constructed with slight variations to achieve maximim comfort and safety at the operator's foot. Any rigid material may be employed such as steel or aluminum and the multiplicity of through holes 47 may be arranged in any pattern so as to provide a safe stepping place and pass excessive mud from a man's foot. The step member 14 can contain at least one opening 45, in its second portion 30, of a size sufficient for receiving the fingers of a man's hand.

Referring to FIG. 3, the inspection plate-step can include a toe stop member 32. The toe stop member 32 has a first flange 36 and a second flange 38 and is of generally "U" configuration. The flanges 36 and 38 are connected to the inner surface 13 of the first member 12. Referring to FIGS. 2 and 3, the toe stop member 32 has at least one opening 50 in its lower edge for providing an exit for mud and other foreign materials. The toe stop member 32 can be connected to the first portion 28 of the step member 14. The first portion 28 of the step member 14 can also be connected to the flanges 36 and 38 of the toe step member 32.

In the operation of the inspection plate-step, a mechanic can service machine components located in the area behind the inspection plate-step 10, by first releasing a plurality of fasteners 58 and removing the inspection plate-step 10 from the inspection port 42. When he completes inspection and servicing, he replaces the inspection plate-step 10 and fasteners 58 and the inspection plate-step 10 in the installed position can be used for climbing to higher service areas on the machine. With such steps being of a substantially nonproducing construction.

When stepping on the step member 14, there is sufficient distance from the second portion 30 to the back of the toe stop member 32 and sufficient width for receiving a man's foot. In the event accumulation of mud forms on the step member 14, the excess is permitted to fall through holes 47 and thence through spaces at location 48 and exit finally at openings 50.

There are cases when an operator needs a hand-hold above his path of assent in order to lift and steady his weight. He may place his fingers in the space between the second portion 30 of the step member flange 14 and the outer surface 22 of the first member 12, and thence through the opening 45, and pull his weight upward from step to step.

The Embodiments of the Invention in which an exclusive property or privilege is claimed are defined as follows:

1. A composite inspection plate-step, comprising:

a first member having a middle portion, inner and outer surfaces, and at least one opening of preselected configuration through said middle portion, said opening being defined by a lower edge;

a step member having first and second portions and being of a general "J" configuration, said first portion extending substantially completely across and a preselected distance through the first member opening and being fixedly connected to and oriented generally normal to the lower edge and generally horizontal in the installed position of the first member, and said second portion having at least one opening being of a size sufficient for receiving the fingers of a man's hand being fixedly connected to the outer surface of said first member; and means for releasably connecting the first member over an inspection port of associated structure.

2. A composite inspection plate-step, as set forth in claim 1, wherein the first portion of the step member contains a multiplicity of holes extending therethrough.

3. A composite inspection plate-step, as set forth in claim 1, including a toe stop member having first and second flanges and being of a generally "U" configuration, said flanges being connected to the inner surface of the first member.

4. A composite inspection plate-step, as set forth in claim 3 wherein the toe stop member has at least one opening in a lower edge thereof.

5. The composite inspection plate-step, as set forth in claim 1 wherein the opening in the first member are of a size sufficient for receiving a man's foot.

6. A composite inspection plate-step, as set forth in claim 3 wherein the first portion of the step member is connected to the toe stop member.

7. A composite inspection plate-step as set forth in claim 1, wherein the first portion of the step member is connected to the flanges of the toe stop member.

8. A composite inspection plate-step, as set forth in claim 1, wherein said inspection plate-step is connected to a tractor.

9. A composite inspection plate-step, as set forth in claim 1, wherein said inspection plate-step is connected to a truck.

10. A composite inspection plate-step, as set forth in claim 1, wherein said inspection plate-step is connected to structure fixed to the ground.

* * * * *